United States Patent [19]

Sato et al.

[11] 4,401,377
[45] Aug. 30, 1983

[54] MOTOR-DRIVEN FILM TRANSPORTING DEVICE IN A SINGLE LENS REFLEX CAMERA INCLUDING MEANS FOR SELECTIVELY DRIVING FILM IN A WIND-UP MODE AND A REWIND MODE

[75] Inventors: Akihiko Sato, Kawasaki; Kenichi Magariyama, Tokyo, both of Japan

[73] Assignee: Nippon Kogaku K. K., Tokyo, Japan

[21] Appl. No.: 322,574

[22] Filed: Nov. 18, 1981

[30] Foreign Application Priority Data

Nov. 27, 1980 [JP] Japan ................................. 55/167258

[51] Int. Cl.³ .............................................. G03B 1/18
[52] U.S. Cl. ..................................... 354/173; 354/214
[58] Field of Search ............... 354/170, 171, 173, 204, 354/205, 212, 214

[56] References Cited

U.S. PATENT DOCUMENTS

| 4,176,936 | 12/1979 | Kozuki et al. ...................... 354/173 |
| 4,351,595 | 9/1982 | Date et al. .......................... 354/173 |

*Primary Examiner*—Alan Mathews
*Attorney, Agent, or Firm*—Shapiro and Shapiro

[57] ABSTRACT

In a single lens reflex camera including a film transporting device capable of selectively effecting a wind-up mode in which a roll film wound on a first spool is taken up by a second spool after it has passed the focal plane of a phototaking lens and a rewind mode in which the film wound on the second spool is taken up by the first spool, and a mirror box for holding a reflecting mirror disposed across the light beam from the phototaking lens imaged on the focal plane and reflecting the light beam in a plane substantially orthogonal to the direction of transport of the film for pivotal movement about an axis passing through one end thereof for retraction from the light beam, the transporting device comprises drive means for selectively rotating the first and second spools in response to selection of said modes. The drive means includes a drive shaft disposed on a side opposed to the first spool with respect to the mirror box, belt means for transmitting the rotation of the drive shaft to the first spool, and means for guiding the belt means substantially in parallelism to the direction of transport of the film near the pivot of the reflecting mirror outside the mirror box.

4 Claims, 3 Drawing Figures

MOTOR-DRIVEN FILM TRANSPORTING DEVICE IN A SINGLE LENS REFLEX CAMERA INCLUDING MEANS FOR SELECTIVELY DRIVING FILM IN A WIND-UP MODE AND A REWIND MODE

BACKGROUND OF THE INVENTION

1. Field of the Invention

This invention relates to a single lens reflex camera using a roll film, and more particularly to a single lens reflex camera which is capable of effecting wind-up and rewind drive by a motor.

2. Description of the Prior Art

In an ordinary single lens reflex camera, a mirror box in which is contained a movable reflecting mirror reflecting a phototaking light beam toward the finder and retracted during photography is provided between the photo-taking lens and the imaging plane. A roll film supply chamber and a roll film take-up chamber are disposed on the opposite sides of the mirror box, and the film is transported from one of the chambers to the other via the imaging plane. There is further known a camera in which, on that side on which the take-up chamber is disposed with respect to the mirror box, there are disposed a wind-up mechanism connected to a spool for winding up the supplied film and a drive mechanism operable by an electric motor to drive the wind-up mechanism and on that side on which the supply chamber is disposed, there is disposed a rewind mechanism connected to the spool of a film magazine. In such a camera, making the operation of the rewind mechanism possible by utilization of the drive mechanism provided on the opposite side is useful for simplification of the mechanism, whereas due to the presence of the mirror box, the arrangement of a transmission device such as a gear train connecting the two mechanisms has hindered compactness of the entire camera.

SUMMARY OF THE INVENTION

It is a primary object of the present invention to provide a single lens reflex camera which is compact and simplified in construction.

It is another object of the present invention to achieve the connection between the aforementioned drive mechanism and the rewind mechanism without making the camera bulky.

The camera according to the present invention includes a film transporting device connecting the drive mechanism positioned on one side of the mirror box to the rewind mechanism positioned on the other side of the mirror box by belt means passed substantially in parallelism to the direction of transport of the film near the pivot of the movable mirror outside the mirror box.

The invention will become more fully apparent from the following detailed description of an embodiment thereof taken in conjunction with the accompanying drawings.

DESCRIPTION OF THE PREFERRED EMBODIMENT

Figure 1:
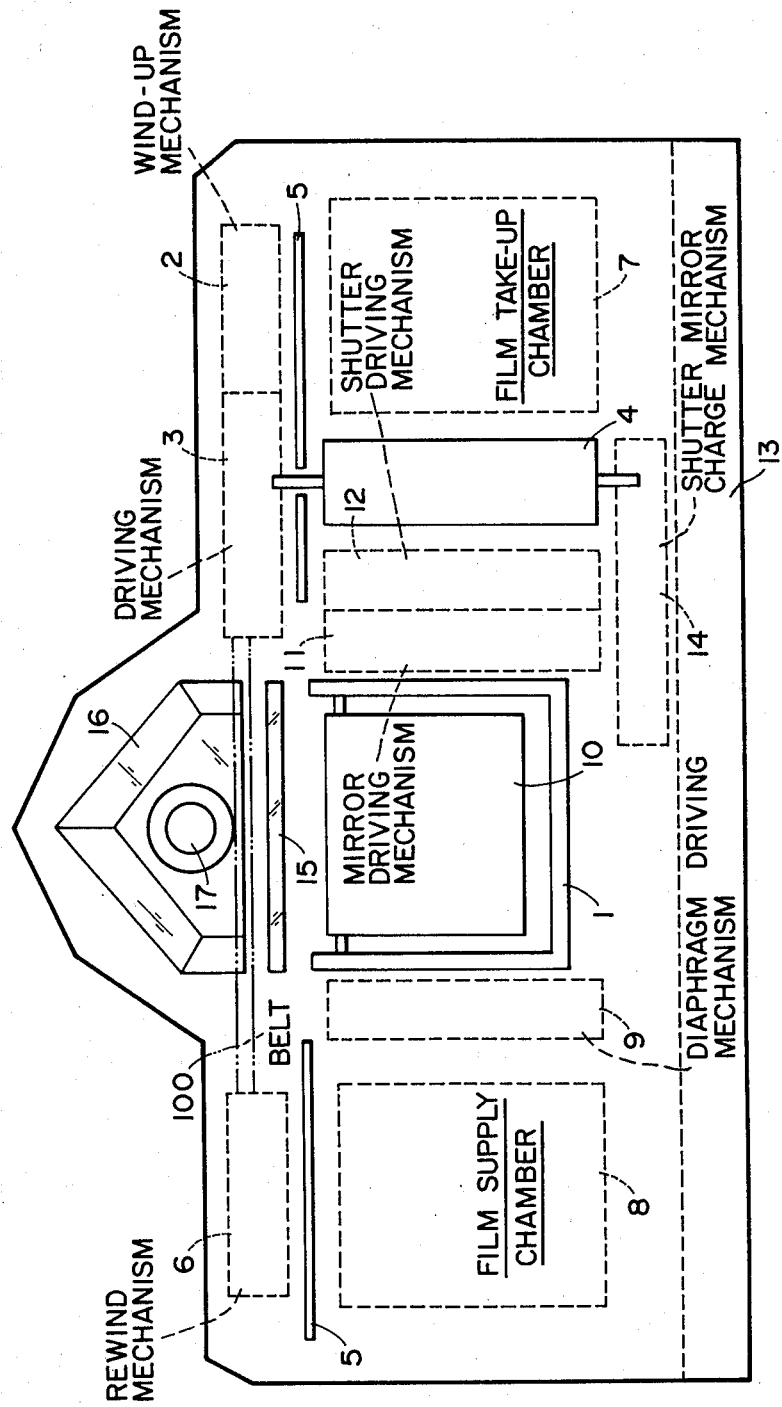
FIG. 1 is a rear view schematically showing the arrangement of the interior mechanisms of a single lens reflex camera according to an embodiment of the present invention.

In the camera shown in FIG. 1, a wind-up mechanism 2 and a driving mechanism 3 for operating the wind-up mechanism 2 with a motor 4 as the drive source are disposed on the right side of a mirror box 1 with a partition plate 5 interposed therebetween. A rewind mechanism 6 is disposed on the left side of the mirror box 1 with a partition plate 5 interposed therebetween.

A film take-up chamber 7 is disposed in proximity to the wind-up mechanism 2, and a film supply chamber 8 for containing a film magazine therein is disposed in proximity to the rewind mechanism 6. A diaphragm driving mechanism 9 is disposed between the mirror box 1 and the supply chamber 8. A mirror driving mechanism 11 for operating a reflecting mirror 10 and a shutter driving mechanism 12 are disposed between the mirror box 1 and the motor 4. A battery containing space 13 is provided at the bottom of the camera. A shutter-mirror charge mechanism 14 is disposed between the mirror driving mechanism 11 and the shutter driving mechanism 12 and the battery containing space 13. A focusing screen 15, a pentaprism 16 and an eyepiece 17 together constitute a well-known finder optical system. The driving mechanism 3 and the rewind mechanism 6 are connected together by a belt, (or "rotating transmitting member") 100 disposed near the pentaprism 16. This arrangement is an example and of course, the present invention is also applicable even where positions of the film supply chamber and the film take-up chamber are reversed compared to what has been described above.

Figure 2:
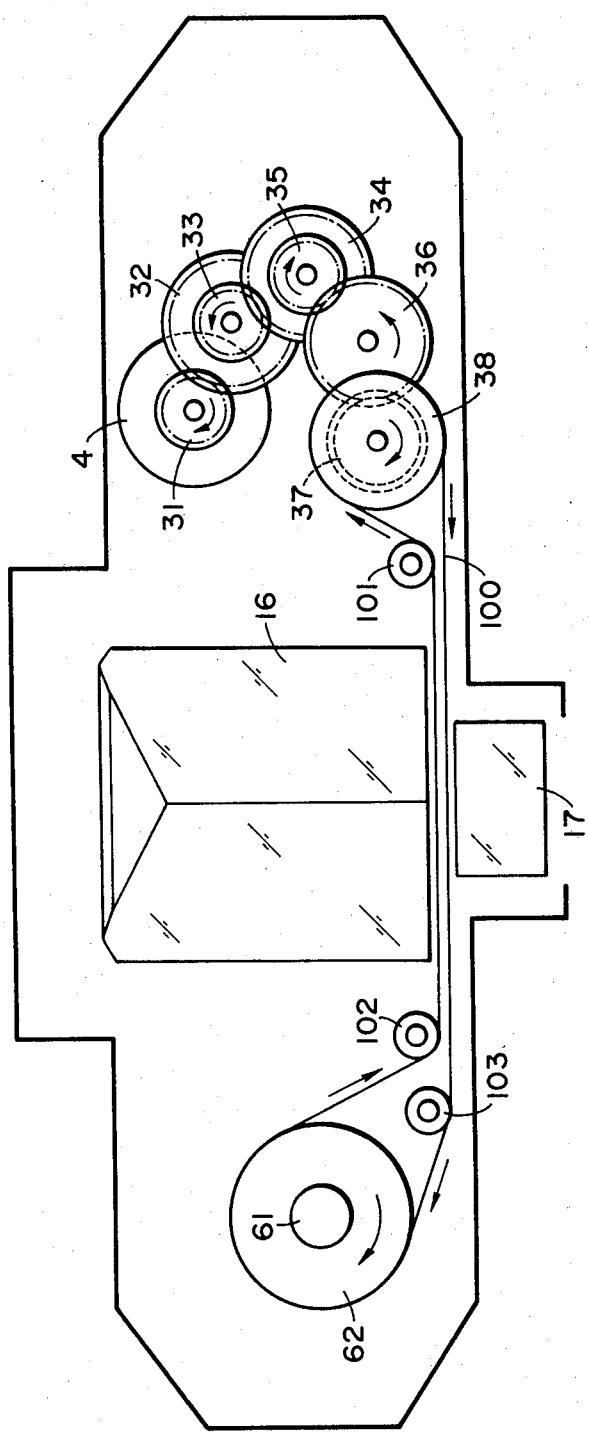
FIG. 2 is a plan view of the camera of FIG. 1.

As shown in FIG. 2, the driving mechanism 3 has a gear 31 directly connected to the shaft of the motor 4, reduction gears 32, 33, 34 and 35 connected to the gear 31, an idle gear 36 in mesh with the gear 35, and a shaft gear 37 of a pulley 38 in mesh with the gear 36. The motor 4 revolves in normal direction during wind-up and revolves in reverse direction during rewind. A clutch, not shown, is disposed around the shaft gear 37 and by this clutch, rotation of the shaft gear 37 may be transmitted to the wind-up mechanism during normal revolution of the motor and rotation of the shaft gear 37 may be transmitted to the rewind mechanism during reverse revolution of the motor. Of course, the rewind mechanism does not operate during normal revolution of the motor and the wind-up mechanism does not operate during reverse revolution of the motor. A rewind side pulley 62 is integrally provided on a rewind shaft 61 coupled to the spool of the film magazine contained in the film supply chamber. A belt 100 is extended between the wind-up side pulley 38 and the rewind side pulley 62 with rollers 101, 102 and 103 interposed therebetween. The rollers 101, 102 and 103 serve to control the direction and position of the belt 100. The belt 100 passes through the space outside the optical path between the eyepiece 17 and the pentaprism 16.

During the rewind for transporting into the supply chamber 8 the film transported into the take-up chamber 7 by revolution of the motor 4, the motor 4 is caused to start reverse revolution by a rewind operation start signal. This revolution (in the direction of arrow) is transmitted to the pulley shaft gear 37 via the gear train 31-36. At this time, the pulley 38 is rotated with the shaft gear 37 by the connecting operation between the clutch around the shaft gear 37 and the pulley 38. The rotation of this pulley 38 is transmitted to the pulley 62 through the belt 100 to cause rotation of the rewind shaft 61. The rewind shaft 61 causes a rewind coupling (not shown) projected into the supply chamber 8 to rotate the spool of the film magazine, whereby film rewind is effected. The reverse rotation of the shaft gear 37 by the normal revolution of the motor 4 during wind-up is not transmitted to the pulley 38 by the clutch. The rotation of the shaft gear 37 is transmitted to the wind-up mechanism 2. By the operation of the wind-up mechanism 2, the take-up spool (not shown) in the film take-up chamber 7, a sprocket, not shown, etc. are driven, whereby film wind-up is effected. The wind-up mechanism 2 charges the shutter and mirror simultaneously with the film wind-up.

Figure 3:
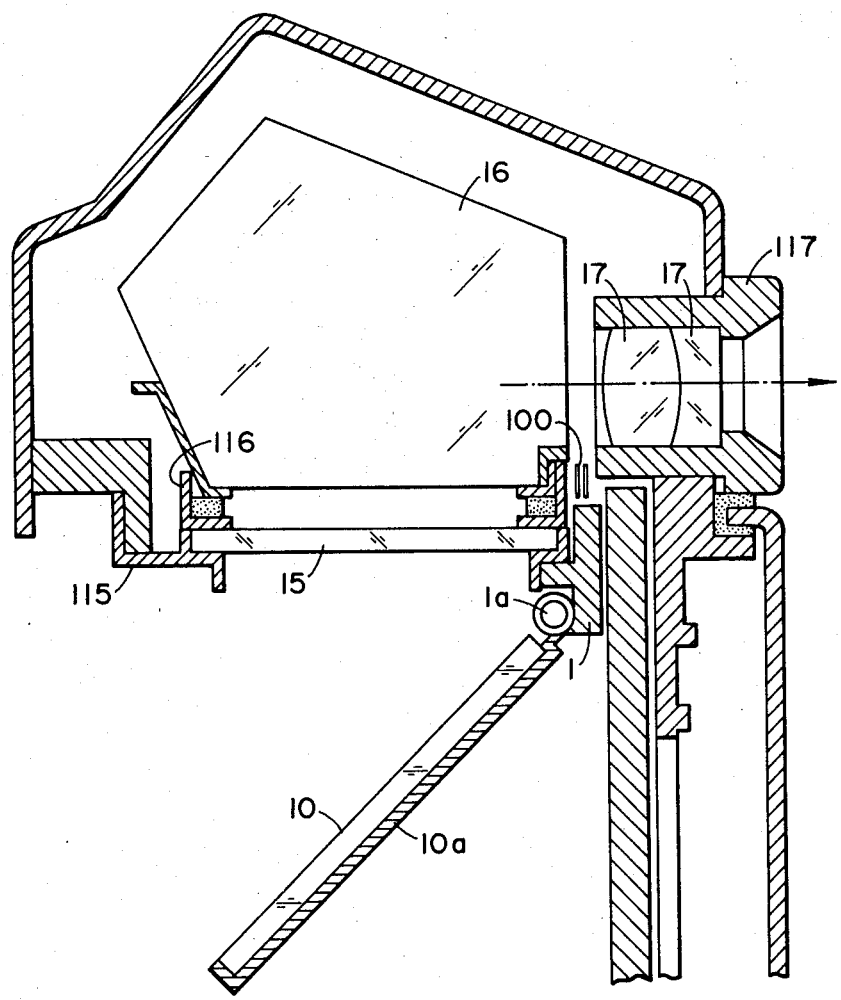
FIG. 3 is a longitudinal cross-sectional view of a part of the camera of FIG. 1.

The arrangement of the belt 100 is fully shown in FIG. 3. A screen 15 is supported by a support frame 115, the pentaprism 16 is supported by a support frame 116, and the eyepiece 17 is supported by a barrel 117. A movable reflecting mirror 10 is secured to a support member 10a pivotable about the shaft 1a of the mirror box 1. A clearance surrounded by the support frames 115, 116, 117 and the mirror box 1 is formed under the optical patch leading from the pentaprism 16 to the eyepiece 17, and the belt 100 is disposed in this clearance.

In the present embodiment, the motor which is the drive source is contained within the camera. Of course, however, the present invention is also applicable to a camera in which a motor is provided within a motor drive device mountable to the camera and the driving mechanism in the camera is operated by this motor.

We claim:

1. In a single lens reflex camera including a film transporting device capable of selectively effecting a wind-up mode in which a roll film wound on a first spool is taken up by a second spool after it has passed the focal plane of a phototaking lens and a rewind mode in which said film wound on said second spool is taken up by said first spool, and a mirror box for holding a reflecting mirror disposed across the light beam from said phototaking lens imaged on said focal plane for reflecting said light beam in a plane substantially orthogonal to the direction of transport of said film, said mirror being mounted for pivotal movement about an axis passing through one end thereof for retraction from said light beam, the improvement in said transporting device comprising:

drive means for selectively rotating said first and second spools in response to selection of said modes, said drive means including a drive shaft disposed on a side opposed to said first spool with respect to said mirror box, belt means for transmitting the rotation of said drive shaft to said first spool, and means for guiding said belt means substantially in parallelism to the direction of transport of said film near the pivot of said reflecting mirror outside said mirror box.

2. The improvement recited in claim 1, wherein said camera further includes a finder optical system including a screen upon which the reflected light beam from said reflecting mirror is projected, an eyepiece having an optical axis substantially parallel to the optical axis of said phototaking lens, and a pentaroof prism for directing the light beam from said screen to said eyepiece, and wherein said finder optical system and said mirror box are disposed relative to each other so as to form a predetermined clearance surrounded by said eyepiece, said pentaroof prism and said mirror box, and said being disposed to guide the belt means through said predetermined clearance.

3. The improvement recited in claim 1, wherein said drive means further includes an electric motor for driving said drive shaft.

4. In a single lens reflex camera including a film transporting device capable of selectively effecting a wind-up mode in which a roll film wound on first spool means is taken up by second spool means after it has passed the focal plane of a phototaking lens and a rewind mode in which said film wound on said second spool means is taken up by said first spool means, and a mirror box for holding a reflecting mirror disposed across the light beam from said phototaking lens imaged on said focal plane for reflecting said light beam in a plane substantially orthogonal to the direction of transport of said film, the mirror being mounted for pivotal movement about an axis passing through one end thereof for retraction from said light beam, the improvement in said transporting device comprising:

drive means for selectively rotating said first and second spool means in response to selection of said modes, said drive means including drive shaft means disposed on a side opposed to said first spool means with respect to said mirror box, and means for transmitting the rotation of said drive shaft means to said first spool means, said transmitting means including a rotation transmitting member lying between said drive shaft means and said first spool means substantially in parallelism to the direction of transport of said film near the pivot of said reflecting mirror outside said mirror box.

* * * * *